(12) United States Patent
Mori et al.

(10) Patent No.: US 7,550,121 B2
(45) Date of Patent: Jun. 23, 2009

(54) REACTOR OF SELECTIVE-PERMEATION MEMBRANE TYPE

(75) Inventors: Nobuhiko Mori, Nagoya (JP);
Toshiyuki Nakamura, Nagoya (JP);
Akira Takahashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/828,400

(22) Filed: Jul. 26, 2007

(65) Prior Publication Data
US 2007/0269356 A1 Nov. 22, 2007

Related U.S. Application Data

(63) Continuation of application No. PCT/JP2006/301886, filed on Feb. 3, 2006.

(30) Foreign Application Priority Data

Feb. 4, 2005 (JP) .............................. 2005-028907

(51) Int. Cl.
*B01J 19/00* (2006.01)
*B01D 63/00* (2006.01)
*B01D 50/00* (2006.01)
*B01D 53/34* (2006.01)

(52) U.S. Cl. ...................... 422/239; 422/192; 422/177; 422/187; 210/321.6

(58) Field of Classification Search ................ 422/239, 422/177, 187, 192; 210/321.6
See application file for complete search history.

(56) References Cited

U.S. PATENT DOCUMENTS

| | | | |
|---|---|---|---|
| 5,674,301 A | 10/1997 | Sakai et al. | |
| 5,958,091 A | 9/1999 | Sakai et al. | |
| 6,040,266 A * | 3/2000 | Fay et al. | ............. 502/439 |
| 6,228,147 B1 * | 5/2001 | Takahashi | ............. 95/55 |
| 2002/0029521 A1 | 3/2002 | Oku et al. | |

(Continued)

FOREIGN PATENT DOCUMENTS

JP 06-040703 A1 2/1994

(Continued)

OTHER PUBLICATIONS

Machine translation of Goto et al (JP 2001-213611).*

(Continued)

*Primary Examiner*—Walter D Griffin
*Assistant Examiner*—Natasha Young
(74) *Attorney, Agent, or Firm*—Burr & Brown

(57) ABSTRACT

A selectively permeable membrane reactor includes a reaction tube including a supply port as an inlet port for a raw material gas and a discharge port as an outlet port for an unseparated gas, and a separation tube inserted into the reaction tube. The separation tube includes a selectively permeable membrane exhibiting selective permeability for a specific component on a surface facing the internal space of the reaction tube, and a process port as an outlet port for a separated gas which has passed through the selectively permeable membrane, and a catalyst for promoting a chemical reaction is provided in the reaction tube excluding the separation tube. A catalyst is carried by a foamed body having porous structure to form a foam-molded product and suppresses physical and chemical deterioration in the selectively permeable membrane and allows a mixed gas produced by a catalytic reaction to be efficiently separated.

19 Claims, 11 Drawing Sheets

U.S. PATENT DOCUMENTS

2005/0142049 A1* 6/2005 Amsden et al. ............. 422/219

FOREIGN PATENT DOCUMENTS

| JP | 06-280695 A1 | 10/1994 |
| JP | 07-008766 A1 | 1/1995 |
| JP | 2001-213611 A1 | 8/2001 |
| JP | 2001-348205 A1 | 12/2001 |
| JP | 2002-012403 A1 | 1/2002 |
| JP | 2004-149332 A1 | 5/2004 |
| JP | 3599370 B2 | 12/2004 |
| JP | 2005-219935 A1 | 8/2005 |
| JP | 2005-314163 A1 | 11/2005 |

OTHER PUBLICATIONS

Machine translation of Kobayashi et al (JP 07-008766).*
English translation of JP 2001-213611 A.*
English translation of JP 07-008766 A.*
"*Development of Hydrogen Production with Membrane Reactor*," Mitsubishi Heavy Industries Technical Review, vol. 38, No. 5 (Sep. 2001), p. 246-249.

* cited by examiner

RAW MATERAL GAS

REACTOR OF SELECTIVE-PERMEATION MEMBRANE TYPE

TECHNICAL FIELD

The present invention relates to a selectively permeable membrane reactor used to produce, separate, and take out a specific gas component from a raw material gas utilizing chemical reaction.

BACKGROUND OF THE INVENTION

Hydrogen (gas) has been widely used as a basic material gas in the field of petrochemistry. In recent years, hydrogen has attracted attention as a clean energy source. Hydrogen may be obtained by producing a hydrogen-containing mixed gas from a main raw material gas such as a hydrocarbon (e.g. methane, butane, or kerosene) or an oxygen-containing hydrocarbon (e.g. methanol, ethanol, or dimethyl ether) and a secondary raw material gas such as water (steam), carbon dioxide, or oxygen by utilizing a chemical reaction such as a reforming reaction, a partial oxidation reaction, or a decomposition reaction, and separating and taking out hydrogen from the mixed gas using a selectively permeable membrane (e.g. palladium alloy membrane) which selectively allows hydrogen to pass through. In such a hydrogen production process, a selectively permeable membrane reactor (membrane reactor) which allows the above chemical reaction and selective separation at the same time is suitably used (see patent document 1, for example).

FIG. 7 is a view showing an example of a conventional selectively permeable membrane reactor used to produce hydrogen and is a cross-sectional view showing the structure of the selectively permeable membrane reactor. The selectively permeable membrane reactor shown in FIG. 7 includes a cylindrical reaction tube 31 having an internal space and a separation tube 34 inserted into the internal space of the reaction tube 31. One end of the reaction tube 31 is a supply port 39 serving as an inlet port for a raw material gas, and the other end is a discharge port 40 serving as an outlet port for an unseparated gas. The separation tube 34 is in the shape of a bottomed cylinder and is mainly formed of a porous body exhibiting gas permeability. The separation tube 34 is provided with a selectively permeable membrane 35 on its surface and a process port serving as an outlet port for a separated gas which has passed through the selectively permeable membrane 35. A catalyst 36 is provided between the reaction tube 31 and the separation tube 34 (i.e. internal space of the reaction tube 31 excluding the separation tube 34).

In the selectively permeable membrane reactor shown in FIG. 7, the pellet-shaped (or bead-shaped) catalyst 36 is provided between the reaction tube 31 and the separation tube 34 as a packed bed. The raw material gas supplied through the supply port 39 contacts the catalyst 36 and is decomposed due to reaction or the like to form a hydrogen-containing mixed gas. For example, when the raw material gas is methane and the chemical reaction is a steam reforming reaction, the raw material gas is decomposed into hydrogen, carbon monoxide, and carbon dioxide according to the following reaction formulas (1) and (2) to produce a mixed gas containing these components. The hydrogen in the mixed gases passes through the selectively permeable membrane 35, is selectively introduced into the separation tube 34, and is taken out as a separated gas. An unseparated gas of the mixed gas which does not pass through the selectively permeable membrane 35 is discharged to the outside of the reactor through the discharge port 40.

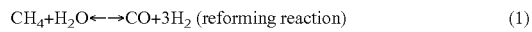
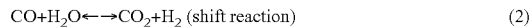

$$CH_4 + H_2O \leftrightarrow CO + 3H_2 \text{ (reforming reaction)} \quad (1)$$

$$CO + H_2O \leftrightarrow CO_2 + H_2 \text{ (shift reaction)} \quad (2)$$

The selectively permeable membrane reactor shown in FIG. 7 has an advantage in that the device can be made compact by allowing reaction and separation at the same time, as described above. Moreover, a separation effect can be obtained in the reversible reaction system shown by the reaction formulas (1) and (2) in which the chemical reaction equilibrium apparently shifts toward the hydrogen-production reaction side by selectively separating hydrogen from the produced mixed gas to the outside of the reaction system (into the separation tube 34). The reaction temperature can be reduced by the separation effect, whereby the reactor may achieve secondary effects such as a decrease in system operating temperature, suppression of deterioration in the metal member, and a reduction in power consumption.

[Patent document 1] JP-A-6-40703
[Patent document 2] JP-A-2001-213611
[Non-patent document 1] Mitsubishi Heavy Industries Technical Review Vol. 38, No. 5 (2001-9), p. 246

DISCLOSURE OF THE INVENTION

However, according to the above selectively permeable membrane reactor, since the catalyst is provided as a packed bed between the separation tube having the selectively permeable membrane on its surface and the reaction tube, there arises a problem that the catalyst contacts the selectively permeable membrane to cause the selectively permeable membrane to physically and chemically deteriorate.

To cope with this, the non-patent document 1 proposes a method using a catalyst provided in a molded product.

However, according to the embodiment disclosed in the non-patent document 1, since an opening is formed between the selectively permeable membrane and the catalyst, the raw material gas may pass through the selectively permeable membrane reactor without undergoing reaction, whereby the separation/recovery efficiency may be decreased. In particular, a decrease in separation/recovery efficiency may occur to a large extent as the flow rate of the raw material gas increases.

In addition, in the vicinity of the supply port of the reaction tube which is the inlet port for the raw material gas, a large amount of, for example, methane contacts the catalyst and undergoes reaction due to a high raw material gas concentration. Therefore, the concentration of mixed gas produced (e.g. hydrogen, carbon monoxide, and carbon dioxide) increases, whereby the permeation amount of gas separated from the mixed gas through the selectively permeable membrane increases. On the other hand, since the concentration of the raw material gas is low near the discharge port of the reaction tube due to the reaction which has occurred on the supply port side (gas inlet side), the amount of, for example, methane which contacts the catalyst and undergoes reaction is reduced. Therefore, the concentration of mixed gas produced (e.g. hydrogen, carbon monoxide, and carbon dioxide) is reduced, whereby the permeation amount of gas separated from the mixed gas through the selectively permeable membrane decreases. As a result, there arises a problem that a sufficient mixed gas separation effect is not achieved.

Moreover, since the mixed gas produced by the catalytic reaction moves through the space between the charged catalyst components due to diffusion, the mixed gas cannot smoothly move toward the selectively permeable membrane side, whereby there arises a problem that the separation/recovery efficiency decreases. In particular, it is difficult to cause the mixed gas produced on the surface of the catalyst provided at a position relatively away from the selectively permeable membrane to pass through the selectively permeable membrane and be separated with a high efficiency.

In contrast, the patent document 2 proposes a method of inserting straightening vanes into the reactor in order to improve the contact efficiency between the mixed gas and the selectively permeable membrane.

However, when the catalyst is provided as a packed bed, the contact efficiency may not be increased since the space between the catalyst components is narrow. Moreover, it is difficult to dispose the straightening vanes between the catalyst components in a controlled manner.

The present invention has been made in view of the above situation. An object of the present invention is to provide a selectively permeable membrane reactor capable of suppressing physical and chemical deterioration in the selectively permeable membrane and allowing a mixed gas produced by catalytic reaction to be efficiently separated using the selectively permeable membrane. As a result of extensive studies, the inventors of the present invention have found that the above object can be achieved by the following means.

That is, according to the present invention, there is provided a selectively permeable membrane reactor comprising: a reaction tube including an internal space having a supply port as an inlet port for a raw material gas and a discharge port as an outlet port for an unseparated gas, and a separation tube inserted into the internal space of the reaction tube, the separation tube including a selectively permeable membrane exhibiting selective permeability for a specific component on a surface facing the internal space of the reaction tube, and a process port as an outlet port for a separated gas which has passed through the selectively permeable membrane, the selectively permeable membrane reactor comprising a foamed body having a porous structure and exhibiting a catalytic effect for promoting a chemical reaction in the internal space of the reaction tube excluding the separation tube.

The term "foamed body exhibiting a catalytic effect" used herein refers to a metal or ceramic porous body having a porous structure in which a number of pores communicate. Such a porous structure may be expressed as a three-dimensional mesh structure or a sponge structure. The foamed body has a high porosity, a low flow resistance, and an extremely large contact area with a fluid. Since the skeleton of the structure exists at random, the foamed body exhibits an excellent contact efficiency with a fluid. Moreover, the foamed body has a reduced weight and easily processed into a desired shape corresponding to the specific embodiment of the selectively permeable membrane reactor.

In the selectively permeable membrane reactor according to the present invention, the embodiment in which a catalyst is disposed in the catalyst foamed body is not particularly limited. It is preferable that a catalyst be disposed in the internal space of the reaction tube excluding the separation tube by being carried by the foamed body as a carrier or by forming the foamed product.

In the selectively permeable membrane reactor according to the present invention, it is preferable that the foamed body exhibiting a catalytic effect have a pore size of 50 µm to 3 mm.

The pore size of the foamed body is more preferably 100 µm to 1 mm, and still more preferably 200 to 700 µm. If the pore size is too small, the flow resistance increases, whereby the flow of the raw material gas and the mixed gas is hindered. If the pore size is too large, the surface area of the foamed body exhibiting a catalytic effect decreases, whereby the catalytic activity may become insufficient. Moreover, the amount of the raw material gas which passes through the selectively permeable membrane reactor without contacting the catalyst to produce the mixed gas is increased, whereby the reaction does not sufficiently proceed. In addition, the mechanical strength and the thermal strength of the foamed body are decreased, whereby breakage or deformation may occur during use. The term "pore size" used herein refers to a value determined by measuring the pore size of thirty pores using an optical microscope or an electron microscope and calculating the average value.

In the selectively permeable membrane reactor according to the present invention, it is preferable that the foamed body exhibiting a catalytic effect have a porosity of 50 to 98%.

The porosity of the foamed body is more preferably 60 to 95%, and still more preferably 70 to 90%. The term "porosity" used herein refers to a value determined by a pycometer method.

The pore size and the porosity of the foamed body may be uniformly or nonuniformly distributed in the internal space of the reaction tube. For example, the foamed body disposed on the supply port side and the foamed body disposed on the discharge port may differ in pore size and porosity.

In the selectively permeable membrane reactor according to the present invention, the catalyst may be formed of a generally-used material. For example, a catalyst prepared by carrying ruthenium or nickel on alumina or zirconia may be used for a reforming reaction.

In the selectively permeable membrane reactor according to the present invention, a catalyst prepared by carrying platinum on alumina or titania may be used for a dehydrogenation reaction.

It is preferable that the foamed body exhibiting a catalytic effect be formed of a ceramic material selected from alumina ($Al_2O_3$), zirconia ($ZrO_2$), titania ($TiO_2$), mullite ($3Al_2O_3 \cdot 2SiO_2$), cordierite ($2MgO \cdot 2Al_2O_3 \cdot 5SiO_2$), silicon carbide (SiC), silicon-infiltrated silicon carbide (Si—SiC), and silicon nitride ($Si_3N_4$), a pure metal material selected from nickel (Ni), iron (Fe), cobalt (Co), copper (Cu), and silver (Ag), or an alloy material selected from nickel (Ni)-iron (Fe), nickel (Ni)-cobalt (Co), nickel (Ni)-copper (Cu), and stainless steel. Note that the material for the foamed body is not limited thereto. The foamed body may be formed of the above catalyst.

The separation tube may include a porous tube formed of a ceramic material selected from alumina ($Al_2O_3$), zirconia ($ZrO_2$), titania ($TiO_2$), mullite ($3Al_2O_3 \cdot 2SiO_2$), cordierite ($2MgO \cdot 2Al_2O_3 \cdot 5SiO_2$), silicon carbide (SiC), silicon-infiltrated silicon carbide (Si—SiC), and silicon nitride ($Si_3N_4$), and a permeable membrane formed on the surface of the porous tube. The permeable membrane may be an inorganic porous membrane formed of zeolite or silica or a metal membrane formed of palladium or the like, for example. Any material may be used insofar as a desired specific component such as hydrogen passes through.

In the selectively permeable membrane reactor according to the present invention, it is preferable that the foamed body exhibiting a catalytic effect be not in contact with the selectively permeable membrane.

When the foamed body is not in contact with the selectively permeable membrane, it is preferable that the distance between the foamed body exhibiting a catalytic effect and the selectively permeable membrane be 100 µm to 20 mm.

The distance is more preferably 200 µm to 5 mm, and still more preferably 500 µm to 2 mm. If the distance between the foamed body and the selectively permeable membrane is too great, a reaction promotion effect due to hydrogen taking-out may not be obtained since the foamed body exhibiting a catalytic effect is apart from the selectively permeable membrane. Moreover, the amount of the raw material gas which passes through the selectively permeable membrane reactor without contacting the catalyst is increased, whereby the reaction may not sufficiently proceed. If the distance between the foamed body and the selectively permeable membrane is too small, position control becomes difficult. As a result, the foamed body may contact the selectively permeable membrane, whereby the selectively permeable membrane may physically deteriorate.

In the selectively permeable membrane reactor according to the present invention, it is preferable that the foamed body exhibiting a catalytic effect have a length (also called the thickness of the foamed body) in a direction almost perpendicular to a direction from the supply port to the discharge port of 1 to 100 mm between an inner wall surface of the reaction tube and the selectively permeable membrane.

The thickness of the foamed body is more preferably 3 to 50 mm, and still more preferably 5 to 20 mm. If the thickness of the foamed body is too great, since the distance of the reaction tube in the diametrical direction (i.e. direction almost perpendicular to the direction from the supply port to the discharge port) increases in the selectively permeable membrane reactor, concentration polarization of the mixed gas occurs, whereby the mixed gas may not smoothly be separated. If the thickness of the foamed body is too small, the mechanical strength and the thermal strength of the foamed body decrease, whereby breakage or deformation may occur during use. Moreover, the catalytic activity may become insufficient due to a decrease in surface area.

In the selectively permeable membrane reactor according to the present invention, it is preferable that the foamed body be divided into a plurality of sections, and a stirring means for stirring the raw material gas supplied to the internal space of the reaction tube through the supply port to disturb the flow of the raw material gas be provided between the sections of the foamed body.

When the stirring means is provided, it is preferable that the selectively permeable membrane reactor comprise a plurality of stirring means.

When selectively permeable membrane reactor comprise a plurality of stirring means, it is preferable that the stirring means be straightening vanes disposed almost perpendicularly to the flow of the raw material gas.

As a preferred embodiment when the stirring means are straightening vanes, an opening through which the raw material gas passes may not be formed in the straightening vanes constituting the stirring means disposed on the side nearest to the discharge port, and an opening through which the raw material gas passes may be formed in the remaining straightening vanes.

When the opening is not formed in the straightening vane disposed on the side nearest to the discharge port and the openings are formed in the remaining straightening vanes, it is preferable that the openings formed in the straightening vanes excluding the straightening vane disposed on the side nearest to discharge port be circular holes.

As another preferred embodiment when the stirring means are straightening vanes, the openings through which the raw material gas passes may be formed in all of the straightening vanes constituting the stirring means, and the openings formed in at least the adjacent straightening vanes may not overlap in the flow direction of the raw material gas.

In the selectively permeable membrane reactor according to the present invention, it is preferable that the straightening vanes not in contact with the selectively permeable membrane.

When the straightening vanes are not in contact with the selectively permeable membrane, it is preferable that the distance between the straightening vanes and the selectively permeable membrane be 100 µm to 20 mm.

The above distance is more preferably 200 µm to 5 mm, and still more preferably 500 µm to 2 mm. If the distance between the straightening vanes and the selectively permeable membrane is too great, since the mixed gas moves apart from the selectively permeable membrane and is not sufficiently separated, a reaction promotion effect may not be obtained. Moreover, since the flow of the raw material gas and the mixed gas produced from the raw material gas moves apart from the selectively permeable membrane, concentration polarization is not suppressed, whereby the stirring means may not exhibit a sufficient effect. If the distance between the straightening vanes and the selectively permeable membrane is too small, position control becomes difficult. As a result, the straightening vanes may contact the selectively permeable membrane, whereby the selectively permeable membrane may physically deteriorate.

The selectively permeable membrane reactor according to the present invention is suitably used when the chemical reaction is a reforming reaction, a partial oxidation reaction, or a decomposition reaction involving steam and/or carbon dioxide or the like using a hydrocarbon and/or an oxygen-containing hydrocarbon or the like as a first raw material gas and one or two or more of water, carbon dioxide, oxygen, or the like as a second raw material gas, the selectively permeable membrane reactor can produce a specific gas component such as hydrogen utilizing the chemical reaction, and the separated gas is hydrogen.

The selectively permeable membrane reactor according to the present invention is also suitably used when the selectively permeable membrane reactor can produce a specific gas component such as hydrogen utilizing a dehydrogenation reaction of a hydrocarbon such as cyclohexane, and the separated gas is hydrogen.

Since the selectively permeable membrane reactor according to the present invention includes the foamed body having a porous structure and exhibiting a catalytic effect (i.e. the catalyst is disposed to form a foam-molded product having a porous structure), the concentration of the permeable component (mixed gas produced from the raw material gas) increases near the selectively permeable membrane, whereby a higher permeation rate is achieved. Since the foamed body has a large pore size and a high porosity, the mixed gas is easily diffused by using the foamed body exhibiting a catalytic effect in comparison with the case of providing a pellet-shaped catalyst of the like, whereby the contact efficiency between the mixed gas and the selectively permeable membrane is increased. A conventional selectively permeable membrane reactor has a problem in which concentration polarization occurs on the surface of the selectively permeable membrane, whereby hydrogen cannot efficiently be separated. The selectively permeable membrane reactor according to the present invention can solve this problem. Moreover, since the separation target mixed gas can effectively be separated over the entire selectively permeable membrane, a reaction rate and a hydrogen recovery rate higher than those of a conventional selectively permeable membrane reactor can be obtained.

In the selectively permeable membrane reactor according to the present invention, the catalyst is disposed to form a foam-molded product having a porous structure. As one embodiment, a foamed body (structure) may be utilized as a catalyst carrier. According to this embodiment, handling of the catalyst is facilitated in comparison with a conventional pellet-shaped catalyst and the like. Moreover, since the foamed body has a reduced weight, maintenance such as catalyst replacement is facilitated.

In a preferred embodiment of the selectively permeable membrane reactor according to the present invention, the foamed body exhibiting a catalytic effect is not in contact with the selectively permeable membrane. Therefore, the permeable membrane can be prevented from physically and chemically deteriorating.

In a preferred embodiment of the selectively permeable membrane reactor according to the present invention, the foamed body is divided into a plurality of sections, and stirring means (e.g. straightening vanes provided perpendicularly to the flow of the raw material gas) for stirring the raw material gas supplied to the internal space of the reaction tube through the supply port to disturb the flow of the raw material gas are provided between the foamed sections. Therefore, the contact efficiency between the mixed gas and the selectively permeable membrane can be improved.

DETAILED DESCRIPTION OF THE INVENTION

Figure 1:
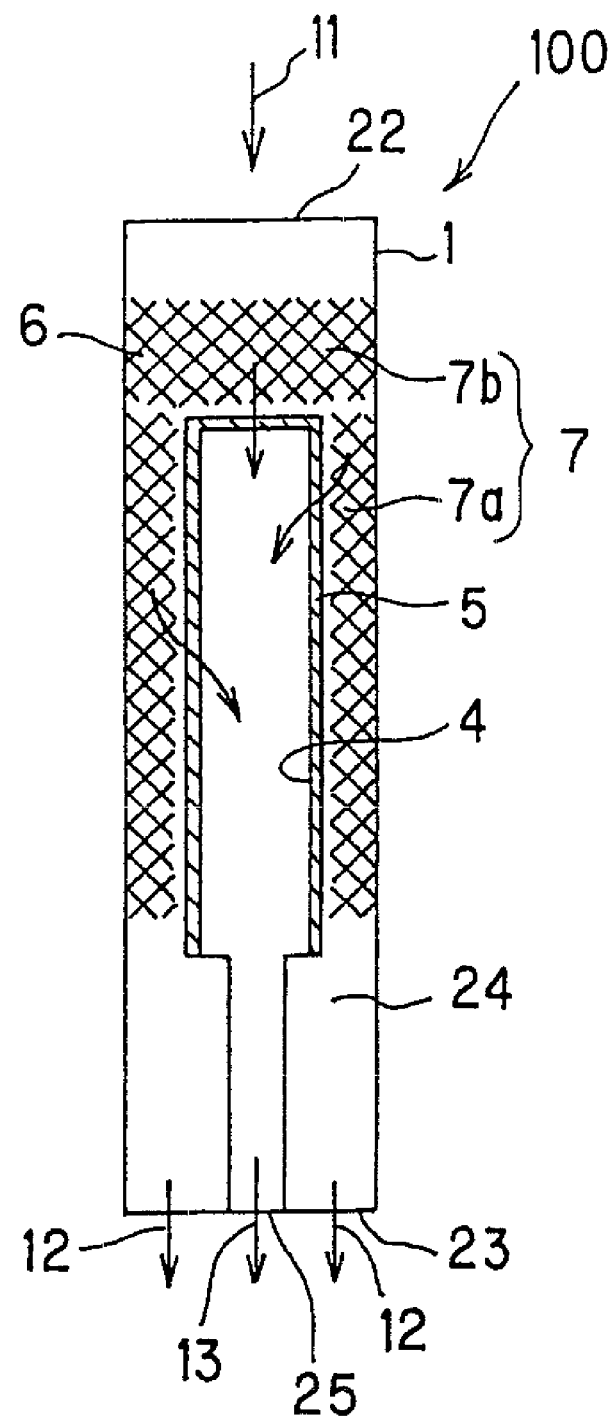
FIG. 1 is a cross-sectional view showing one embodiment of the selectively permeable membrane reactor according to the present invention.

Embodiments of the selectively permeable membrane reactor according to the present invention are described below. Note that the present invention is not limited to the following embodiments. Various alterations, modifications, and improvements may be made without deviating from the scope of the present invention based on knowledge of a person skilled in the art. For example, although the drawings represent preferred embodiments of the present invention, the present invention is not limited to the information provided in the drawings. Although the present invention may be practiced or verified by applying means similar to or equivalent to means described herein, preferred means are means described herein.

FIG. 1 is a cross-sectional view showing one embodiment of the selectively permeable membrane reactor according to the present invention. A selectively permeable membrane reactor 100 shown in FIG. 1 includes a reaction tube 1 and a separation tube 4 inserted into an internal space 24 of the reaction tube 1. The reaction tube 1 includes the internal space 24 provided with a supply port 22 as an inlet port for a raw material gas 11 containing, for example, hydrocarbon and water and a discharge port 23 as an outlet port for an unseparated gas 12 and is almost in the shape of a cylinder. The separation tube 4 is formed of, for example, an alumina porous body of which the surface facing the internal space 24 of the reaction tube 1 exhibits gas permeability, and includes a selectively permeable membrane 5 formed of a palladium (Pd)-silver (Ag) alloy which selectively allows, for example, hydrogen to pass through on its surface and a process port 25 as an outlet port for a separated gas 13 which has passed through the selectively permeable membrane 5.

Figure 7:
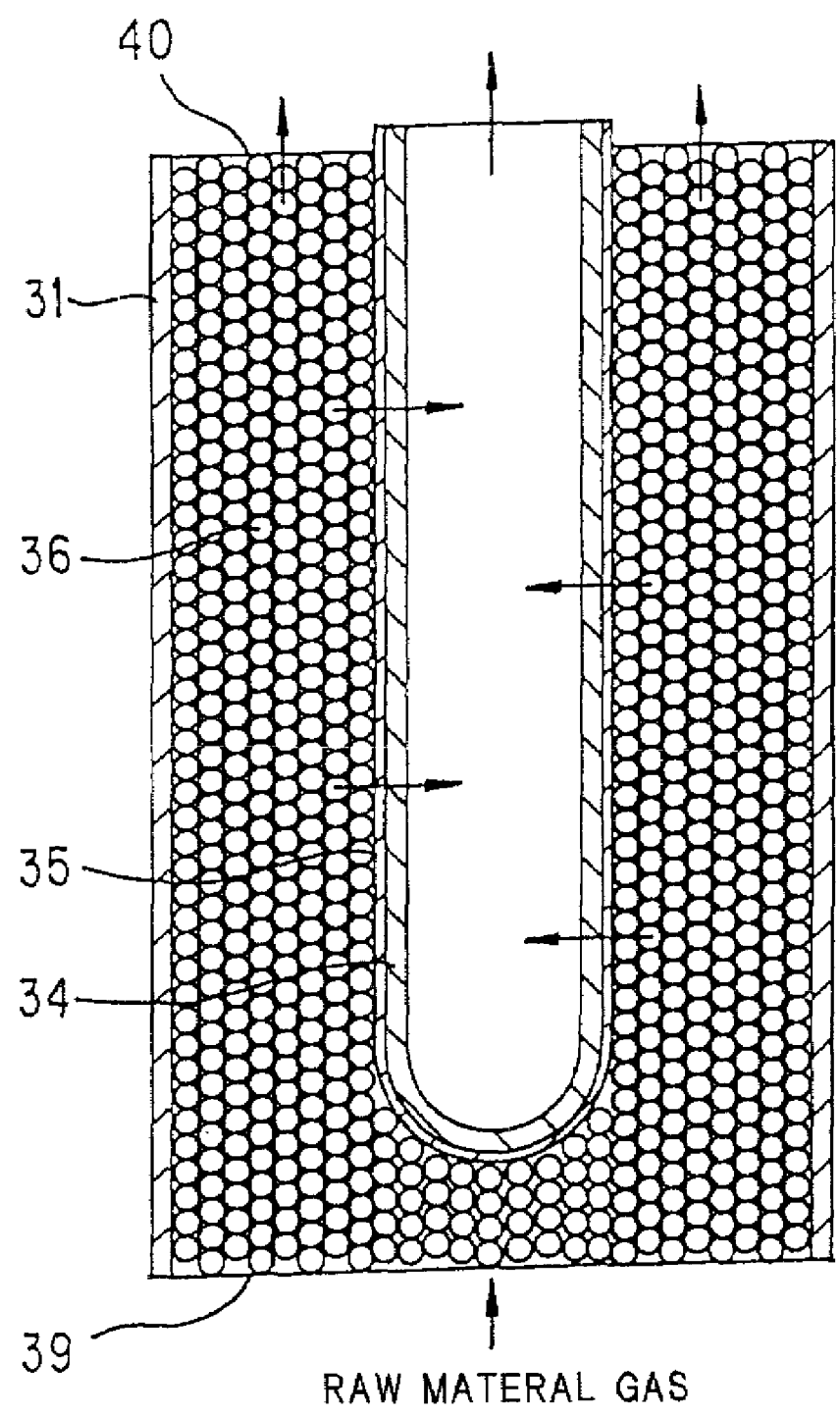
FIG. 7 is a cross-sectional view showing an example of a conventional selectively permeable membrane reactor.

The selectively permeable membrane reactor 100 includes a catalyst 6 for promoting chemical reaction in the internal space 24 of the reaction tube 1 excluding the separation tube 4. The catalyst 6 is formed of, for example, ruthenium-alumina and is carried by a foamed body 7. In more detail, the catalyst 6 is carried by the foamed body 7 as a carrier and disposed in the internal space 24 of the reaction tube 1 excluding the separation tube 4. The foamed body 7 includes a cylindrical foamed body 7a which surrounds the outside of the separation tube 4 without contacting the separation tube 4, and a disk-shaped foamed body 7b disposed on the supply port 22 side and provided without contacting the separation tube 4, wherein each of the foamed bodies 7a and 7b is formed of, for example, cordierite with, for example, a pore size of 500 μm and a porosity of 70%, for example. The foamed bodies 7a and 7b are disposed in the internal space 24 of the reaction tube 1 so that the distance between the foamed bodies 7a and 7b (foamed body 7) and the selectively permeable membrane 5 is 1 mm, for example. Specifically, the space between the reaction tube and the separation tube is not completely filled with the catalyst, differing from a conventional selectively permeable membrane reactor (see FIG. 7).

In the selectively permeable membrane reactor 100, when the raw material gas 11 entering through the supply port 22 contacts the catalyst 6 carried by the foamed body 7, a mixed gas including a target component such as hydrogen is produced by reaction or the like. The resulting mixed gas partially passes through the selectively permeable membrane 5, is selectively introduced into the separation tube 4 (i.e. separated from other components), and is taken out through the process port 25. The components which do not pass through the selectively permeable membrane 5 are discharged to the outside of the reaction tube 1 through the discharge port 23.

Figure 2:
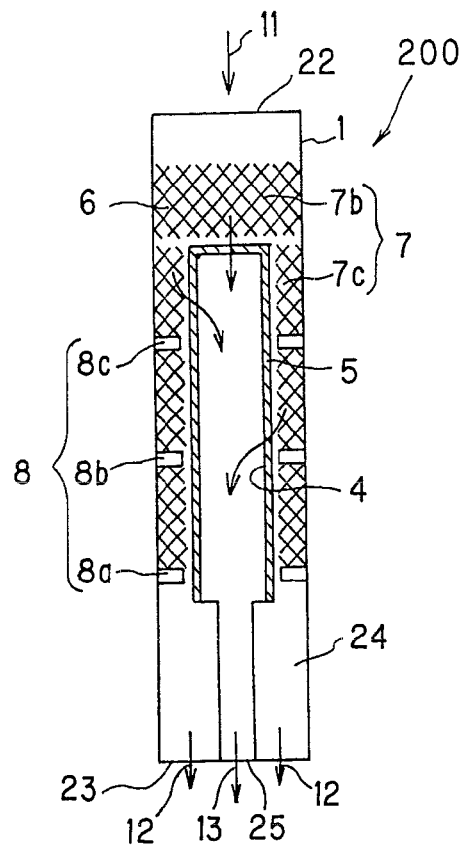
FIG. 2 is a cross-sectional view showing another embodiment of the selectively permeable membrane reactor according to the present invention.
Figure 3:
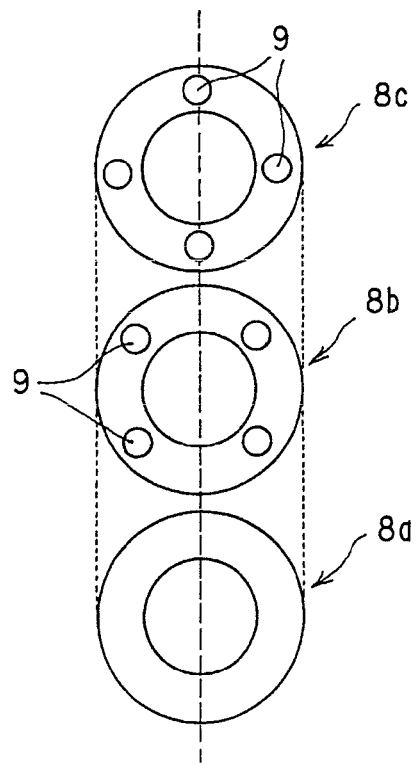
FIG. 3 is a plan view showing an example of stirring means provided in the selectively permeable membrane reactor shown in FIG. 2.
Figure 4:
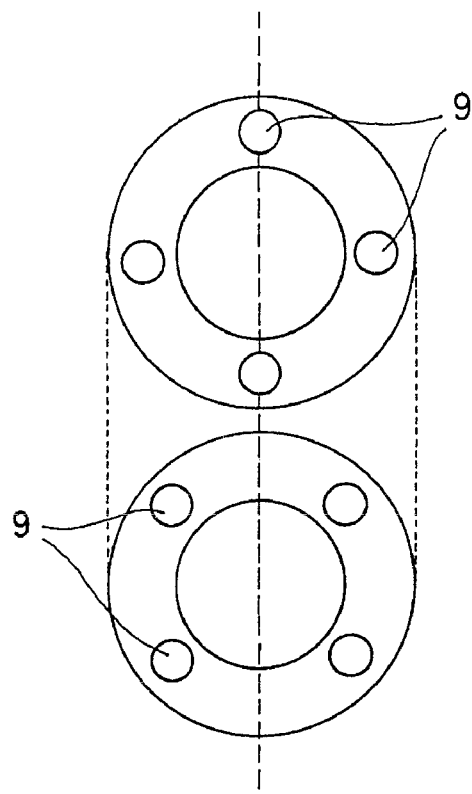
FIG. 4 is a plan view showing requirements for the stirring means of the selectively permeable membrane reactor according to the present invention.
Figure 5:
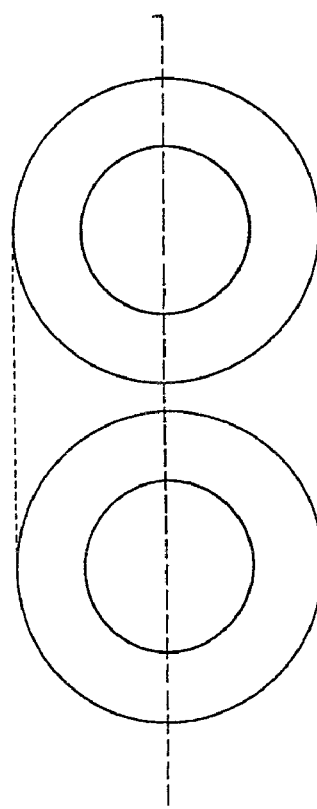
FIG. 5 is a plan view showing requirements for the stirring means of the selectively permeable membrane reactor according to the present invention.

FIG. 2 is a cross-sectional view showing another embodiment of the selectively permeable membrane reactor according to the present invention, and FIG. 3 is a plan view showing an example of a stirring means included in the selectively permeable membrane reactor shown in FIG. 2. FIGS. 4 and 5 are plan views illustrative of requirements for the stirring means. A selectively permeable membrane reactor 200 shown in FIG. 2 is similar to the selectively permeable membrane reactor 100, and includes a reaction tube 1 and a separation tube 4 inserted into an internal space 24 of the reaction tube 1. The reaction tube 1 includes the internal space 24 provided with a supply port 22 as an inlet port for a raw material gas 11 containing a hydrocarbon, water, and the like and a discharge port 23 as an outlet port for an unseparated gas 12, and is almost in the shape of a cylinder. The separation tube 4 is formed of, for example, an alumina porous body of which the surface facing the internal space 24 of the reaction tube exhibits gas permeability, and includes a selectively permeable membrane 5 formed of a palladium (Pd)-silver (Ag) alloy which selectively allows, for example, hydrogen as a specific component to pass through on its surface and a process port 25 as an outlet port for a separated gas 13 which has passed through the selectively permeable membrane 5.

The selectively permeable membrane reactor 200 includes a catalyst 6 for promoting chemical reaction in the internal space 24 of the reaction tube 1 excluding the separation tube 4. The catalyst 6 is formed of ruthenium-alumina or the like, and is carried by a foamed body 7. In more detail, the catalyst 6 is carried by the foamed body 7 as a carrier and disposed in the internal space 24 of the reaction tube 1 excluding the separation tube 4. The foamed body 7 includes a cylindrical foamed body 7c which surrounds the outside of the separation tube 4 without contacting the separation tube 4, and a disk-shaped foamed body 7b disposed on the supply port 22 side and provided without contacting the separation tube 4, wherein each of the foamed bodies 7b and 7c is formed of, for example, cordierite with, for example, a pore size of 500 μm and a porosity of 70%, for example. The foamed bodies 7b and 7c are disposed in the internal space 24 of the reaction tube 1 so that the distance between the foamed bodies 7b, 7c (foamed body 7) and the selectively permeable membrane 5 is 1 mm, for example.

The selectively permeable membrane reactor 200 differs from the selectively permeable membrane reactor 100 in that the foamed body 7c is divided into three sections and straightening vanes 8 are provided as stirring means. The straightening vanes 8 include three straightening vanes 8a, 8b, and 8c provided between the three sections of the foamed body 7c and the discharge port side (downstream). Each of the straightening vanes 8a, 8b, and 8c is disposed almost perpendicularly to the flow of the raw material gas 11 at an interval of 1 mm from, for example, the selectively permeable membrane 5 without contacting the selectively permeable membrane 5 in the same manner as the foamed body 7 (7b and 7c) and stirs the raw material gas 11 supplied to the internal space 24 of the reaction tube 1 through the supply port 22 to disturb the flow of the raw material gas 11, for example.

FIG. 3 shows the plan view of each of the straightening vanes 8a, 8b, and 8c with the center axis aligned. As shown in FIG. 3, a plurality of circular holes 9 (openings) are formed in the straightening vane 8c disposed on the supply port 22 side (upstream) and the straightening vane 8b in the middle, and the circular holes 9 (openings) ate not formed in the straightening vane 8a provided on the discharge port side (downstream). Since the circular holes 9 are not formed in the straightening vane 8a, the mixed gas which has not passed through the selectively permeable membrane 5 can be caused to flow toward the selectively permeable membrane 5.

In the selectively permeable membrane reactor according to the present invention, the straightening vanes other than the straightening vane disposed furthest downstream may not have the circular hole. It is preferable to provide the straightening vanes to have an outer diameter equal to the inner diameter of the reaction tube so that the selectively permeable membrane is disposed inside the straightening vanes (see FIG. 5). When the circular holes are formed in the straightening vanes excluding the straightening vane disposed furthest downstream, it is preferable to displace the positions of the circular holes formed in the adjacent straightening vanes (see FIG. 4). In the example shown in FIG. 4, the positions of the circular holes 9 are displaced by 45 degrees.

Figure 13:
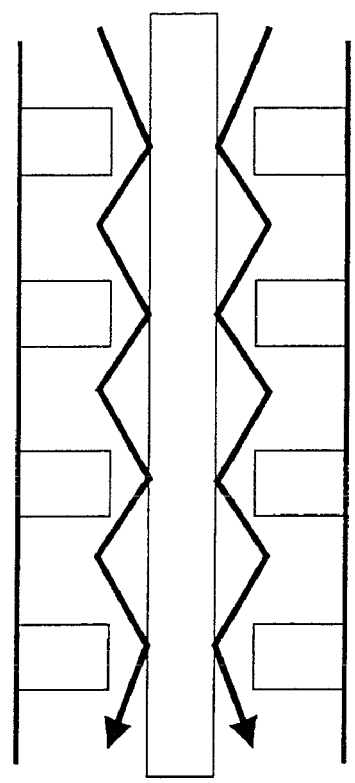
FIG. 13 is a cross-sectional view showing a selectively permeable membrane reactor having stirring means (straightening vanes) similar to that of the selectively permeable membrane reactor shown in FIG. 2, in which the flow of a raw material gas and a mixed gas produced from the raw material gas is indicated by the arrows.

In the selectively permeable membrane reactor 200, when the raw material gas 11 entering through the supply port 22 contacts the catalyst 6 carried by the foamed body 7, a mixed gas including a target component such as hydrogen is produced by reaction or the like. The resulting mixed gas is caused to flow toward the selectively permeable membrane 5 due to the straightening vanes 8 which disturb the flow of the mixed gas, partially passes through the selectively permeable membrane 5, is selectively introduced into the separation tube 4 to be separated from other components, and is taken out through the process port 25. The components which do not pass through the selectively permeable membrane 5 are discharged to the outside of the reaction tube 1 through the discharge port 23. In the selectively permeable membrane reactor 200, the raw material gas and the mixed gas flow through the reaction tube while being caused to flow toward the selectively permeable membrane, as indicated by the arrows in FIG. 13.

Figure 9:
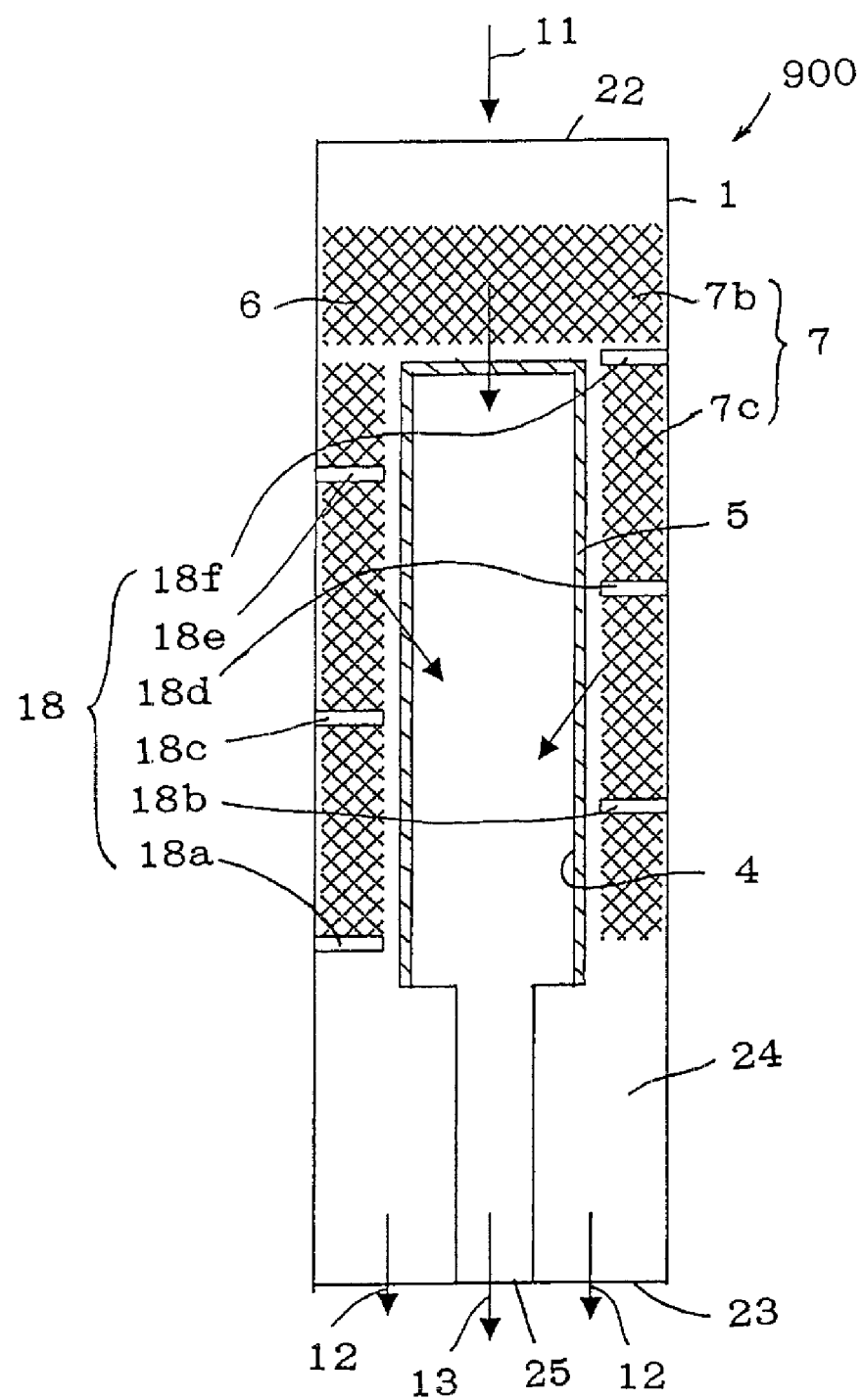
FIG. 9 is a cross-sectional view showing still another embodiment of the selectively permeable membrane reactor according to the present invention.
Figure 10:
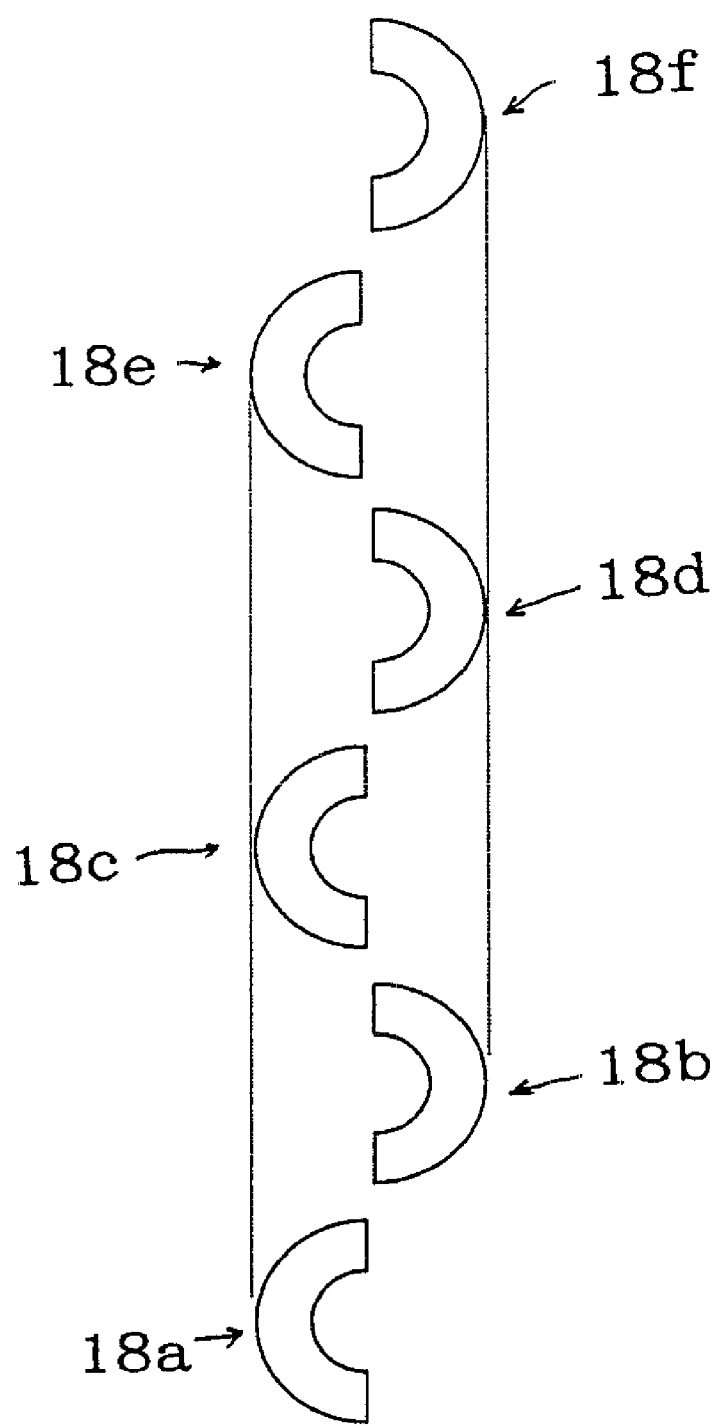
FIG. 10 is a plan view showing an example of stirring means provided in the selectively permeable membrane reactor shown in FIG. 9.

FIG. 9 is a cross-sectional view showing still another embodiment of the selectively permeable membrane reactor according to the present invention, and FIG. 10 is a plan view showing an example of a stirring means included in the selectively permeable membrane reactor shown in FIG. 9. A selectively permeable membrane reactor 900 shown in FIG. 9 is similar to the aforementioned selectively permeable membrane reactor 200 and includes a reaction tube 1 and a separation tube 4 inserted into an internal space 24 of the reaction tube 1. In the selectively permeable membrane reactor 900, the reaction tube 1 includes the internal space 24 provided with a supply port 22 as an inlet port for a raw material gas 11 containing, for example, a hydrocarbon and water and a discharge port 23 as an outlet port for an unseparated gas 12, and is almost in the shape of a cylinder. The separation tube 4 is formed of an alumina porous body or the like of which the surface facing the internal space 24 of the reaction tube 1 exhibits gas permeability and includes a selectively permeable membrane 5 formed of a palladium (Pd)-silver (Ag) alloy which selectively allows, for example, hydrogen to pass through on its surface and a process port 25 as an outlet port for a separated gas 13 which has passed through the selectively permeable membrane 5.

The selectively permeable membrane reactor 900 includes a catalyst 6 for promoting chemical reaction in the internal space 24 of the reaction tube 1 excluding the separation tube 4 in the same manner as the selectively permeable membrane reactor 200. The catalyst 6 is formed of, for example, ruthenium-alumina, and is carried by a foamed body 7. In more detail, the catalyst 6 is carried by the foamed body 7 as a carrier and disposed in the internal space 24 of the reaction tube 1 excluding the separation tube 4. The foamed body 7 includes a cylindrical foamed body 7c which surrounds the outside of the separation tube 4 without contacting the separation tube 4 and a disk-shaped foamed body 7b disposed on the supply port 22 side and provided without contacting the separation tube 4, wherein each of the foamed bodies 7c and 7b is formed of, for example, cordierite with a pore size of 500 μm and a porosity of 70%. The foamed bodies 7b and 7c are disposed in the internal space 24 of the reaction tube 1 so that the distance between the foamed bodies 7b and 7c (foamed body 7) and the selectively permeable membrane 5 is 1 mm, for example.

The selectively permeable membrane reactor 900 is the same as the selectively permeable membrane reactor 200 in that straightening vanes are disposed in multiple stages as stirring means almost perpendicularly to the flow of the raw material gas. On the other hand, the selectively permeable membrane reactor 900 differs from the selectively permeable membrane reactor 200 in that each of straightening vanes 18a to 18f forming straightening vanes 18 is in the shape of a half ring and has a size (area) approximately half of the area (area excluding the separation tube 4) of the surface (ring-shaped surface) of the reaction tube 1 almost perpendicular to the flow of the raw material gas. In FIG. 10, the plane of each of the straightening vanes 18a, 18b, 18c, 18d, 18e, and 18f is aligned with the center axis of the reaction tube 1 in a state in which the straightening vanes 18a, 18b, 18c, 18d, 18e, and 18f are disposed in the reaction tube 1. As shown in FIGS. 9 and 10, the selectively permeable membrane reactor 900 also differs from the selectively permeable membrane reactor 200 in that the six straightening vanes 18a to 18f (a plurality of stirring means) are provided so that the adjacent straightening vanes do not overlap in the direction of the flow of the raw material gas and the portions in which the half ring-shaped straightening vanes do not exist (openings formed by partially removing the ring) do not overlap.

The embodiment described above as shown in FIGS. 9 and 10 of the selectively permeable membrane reactor 900 may be realized by equally dividing the cylindrical foamed body 7c into two sections along a plane including the center axis (i.e. equally dividing the cylindrical foamed body 7c into two sections in parallel to the direction of the flow of the raw material gas) into a semicylindriical shape, dividing each of the two sections of the equally divided foamed body 7c into three sections almost perpendicularly to the flow of the raw material gas at desired positions, and disposing the straightening vanes 18a, 18b, 18c, 18d, 18e, and 18f between the suctions of the divided foamed body 7c, between the foamed body 7b and the divided foamed body 7c, or on the discharge port side (downstream side) of the divided foamed body 7c. In this case, the foamed body 7c is divided into six sections, and each of the divided sections has a semicylindrical shape. The embodiment shown in FIGS. 9 and 10 of the selectively permeable membrane reactor 900 may also be realized by forming cut portions at desired positions of one cylindrical foamed body 7c and incorporating the half ring-shaped straightening vanes 18a to 18f into the cut portions.

In the selectively permeable membrane reactor 900, each of the six straightening vanes 18a, 18b, 18c, 18d, 18e, and 18f constituting the straightening vanes 18 is disposed almost perpendicularly to the flow of the raw material gas 11 at an interval of 1 mm from the selectively permeable membrane 5 without contacting the selectively permeable membrane 5 in the same manner as the foamed body 7 (7b and 7c), and stirs the raw material gas 11 supplied to the internal space 24 of the reaction tube 1 through the supply port 22 or the mixed gas produced from the raw material gas 11 to disturb the flow of the raw material gas 11, for example. Specifically, in the selectively permeable membrane reactor 900, the raw material gas 11 entering the reaction tube 1 through the supply port 22 collides with the straightening vane 18f on the side where the straightening vane 18f is present to move toward the straightening vane 18e, is mixed with the raw material gas 11 entering toward the straightening vane 18e from the beginning, collides with the straightening vane 18e to move toward the straightening vane 18d, further moves toward the straightening vane 18c, moves toward the straightening vane 18b, and moves toward the straightening vane 18a. In these flows, when the raw material gas 11 contacts the catalyst 6 carried by the foamed body 7, a mixed gas including a target component such as hydrogen is produced by reaction or the like. The resulting mixed gas is caused to flow toward the selectively permeable membrane 5 due to the straightening vanes 18 (straightening vanes 18a to 18f) which disturb the flow of the mixed gas, partially passes through the selectively permeable membrane 5, is selectively introduced into the separation tube 4 (i.e. separated from other components), and is taken out through the process port 25. The components which do not pass through the selectively permeable membrane 5 are discharged to the outside of the reaction tube 1 through the discharge port 23.

Figure 11:
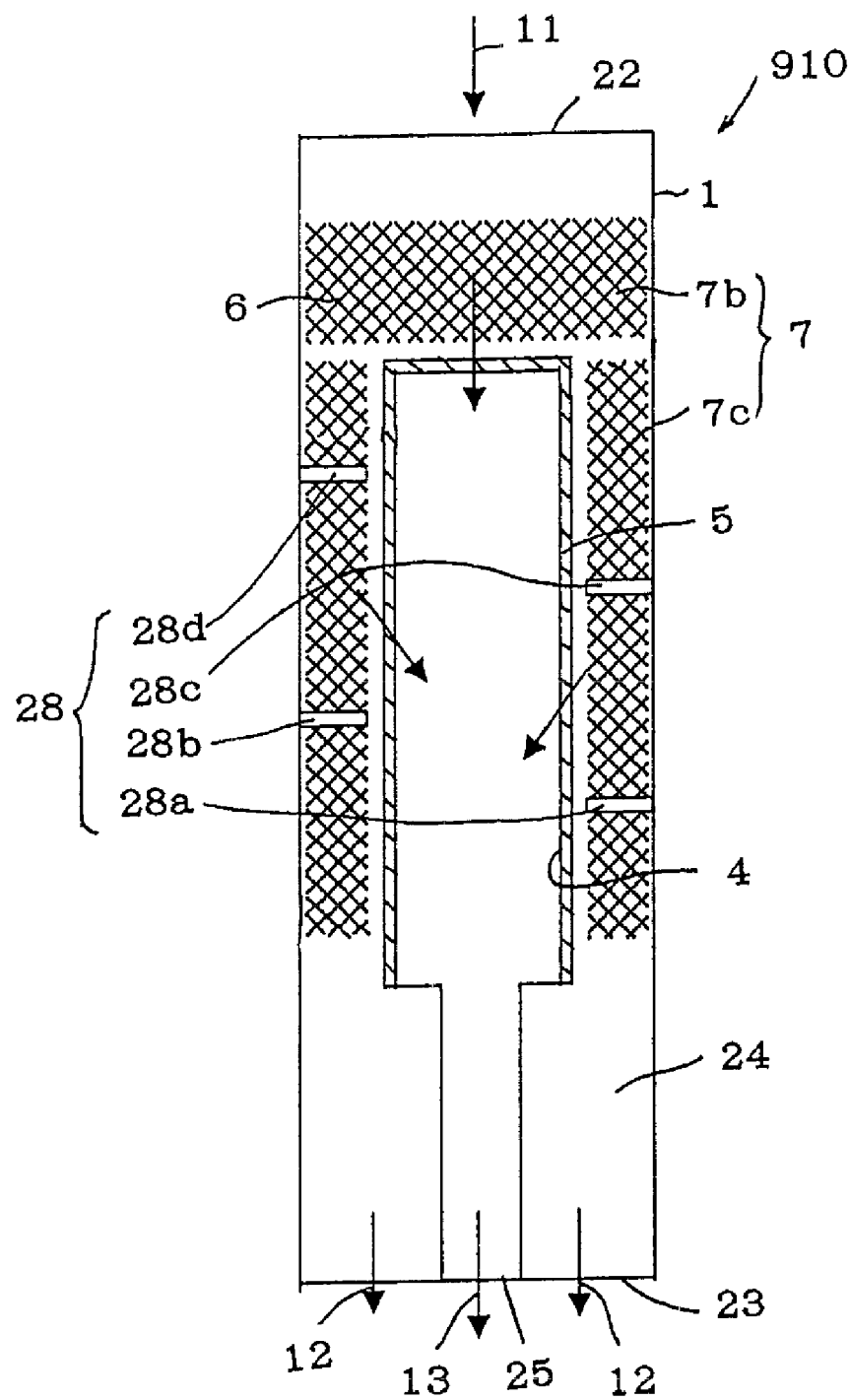
FIG. 11 is a cross-sectional view showing yet another embodiment of the selectively permeable membrane reactor according to the present invention.
Figure 12:
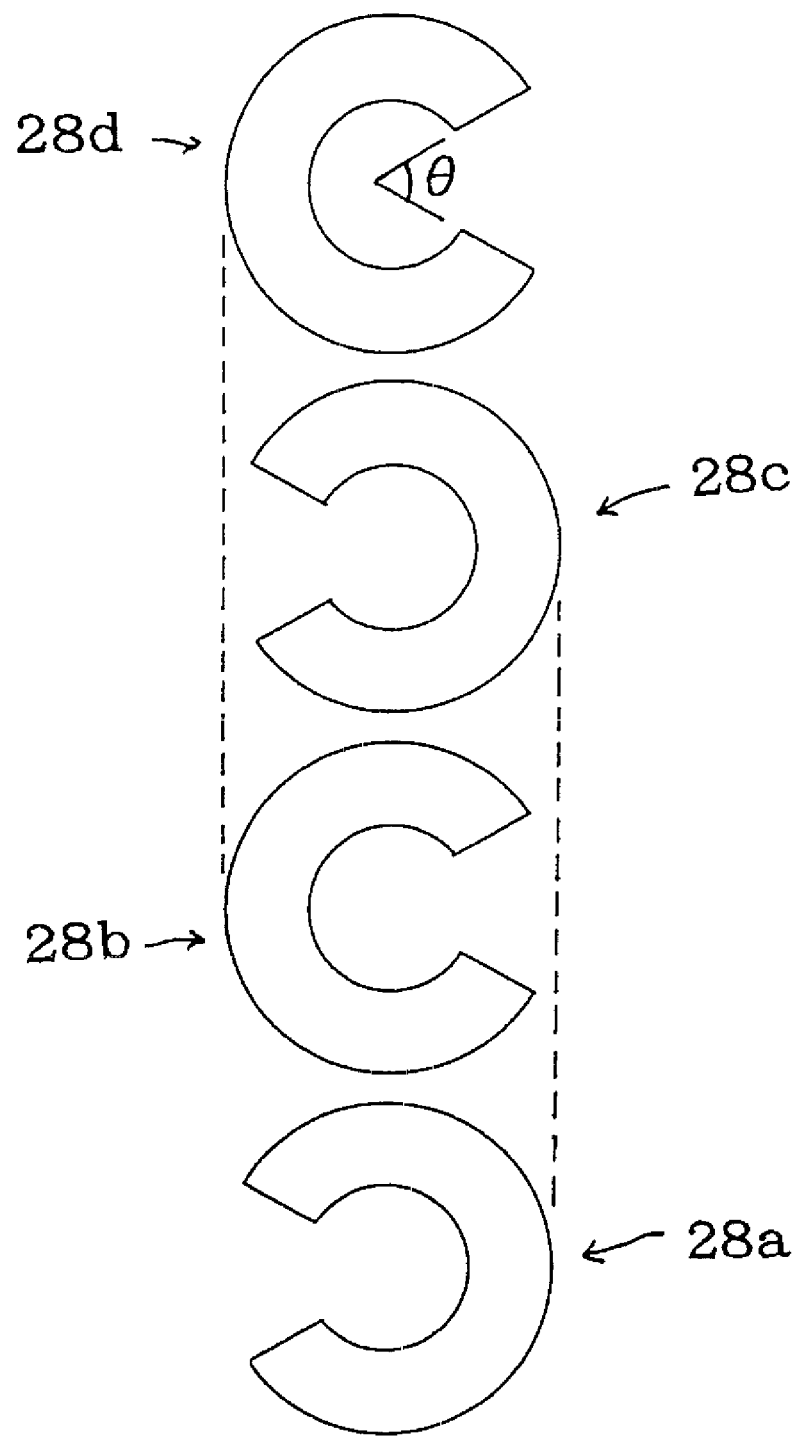
FIG. 12 is a plan view showing an example of stirring means provided in the selectively permeable membrane reactor shown in FIG. 11.

FIG. 11 is a cross-sectional view showing yet another embodiment of the selectively permeable membrane reactor according to the present invention, and FIG. 12 is a plan view showing an example of a stirring means included in the selectively permeable membrane reactor shown in FIG. 11. A selectively permeable membrane reactor 910 shown in FIG. 11 is the same as the selectively permeable membrane reactor 900 except for the configuration (number and shape) of a plurality of stirring means (straightening vanes). In the following description, description of the same sections as the selectively permeable membrane reactor 900 is omitted.

The selectively permeable membrane reactor 910 is the same as the selectively permeable membrane reactors 200 and 900 in that straightening vanes are disposed in multiple stages as stirring means almost perpendicular to the flow of the raw material gas. In the selectively permeable membrane reactor 900, each of the straightening vanes 18a to 18f forming the straightening vanes 18 is in the shape of a half ring. In the selectively permeable membrane reactor 910, each of straightening vanes 28a to 28d forming straightening vanes 28 is in the shape of ⅚th of a ring and has a size (area) approximately ⅚th of the area (area excluding the separation tube 4) of the surface (ring-shaped surface) of the reaction tube 1 almost perpendicular to the flow of the raw material gas. In other words, the center angle θ (see FIG. 12) of the straightening vanes 28a to 28d indicating the opening of the ring is 60 degrees. In FIG. 10, the center angle θ (not shown) indicating the opening is 180 degrees since the straightening vanes 18a to 18f are in the shape of a half ring (½ ring shape). In the selectively permeable membrane reactor according to the present invention, a straightening vane having an opening with a center angle θ of 5 to 180° is suitably employed. FIG. 12 shows the plan view of each of the straightening vanes 28a, 28b, 28c, and 28d aligned with the center axis of the reaction tube 1 in a state in which the plane of each of the straightening vanes 28a, 28b, 28c, and 28d is disposed in the reaction tube 1. In the selectively permeable membrane reactor 910, since the four straightening vanes 28a to 28d (a plurality of stirring means) are larger than a half ring, differing from the selectively permeable membrane reactor 900, the substantial portions of the adjacent straightening vanes partially overlap in the direction of the flow of the raw material gas, but the openings of the straightening vanes are displaced in the direction of the flow of the raw material gas so that the openings do not overlap, as shown in FIGS. 11 and 12.

Figure 14:
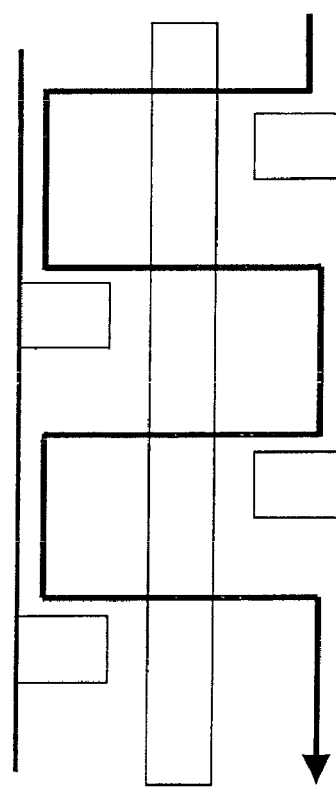
FIG. 14 is a cross-sectional view showing a selectively permeable membrane reactor having stirring means (straightening vanes) of the same embodiment as that of the selectively permeable membrane reactor shown in FIG. 11, in which the flow of a raw material gas and a mixed gas produced from the raw material gas is indicated by the arrows.

In the selectively permeable membrane reactor 910, the raw material gas 11 entering the reaction tube 1 through the supply port 22 collides with the straightening vane 28d to move toward the straightening vane 28c, is mixed with the raw material gas 11 entering toward the straightening vane 28c, collides with the straightening vane 28c to move toward the straightening vane 28b, and moves toward the straightening vane 28a, In these flows, when the raw material gas 11 contacts the catalyst 6 carried by the foamed body 7, a mixed gas including a target component such as hydrogen is produced by reaction or the like. The resulting mixed gas is caused to flow perpendicularly toward the selectively permeable membrane 5 due to the straightening vanes 28 (straightening vanes 28a to 28d) which disturb the flow of the mixed gas, partially passes through the selectively permeable membrane 5, is selectively introduced into the separation tube 4 (i.e. separated from other components), and is taken out through the process port 25. The components which do not pass through the selectively permeable membrane 5 are discharged to the outside of the reaction tube 1 through the discharge port 23. In the selectively permeable membrane reactor 910, the raw material gas and the mixed gas flow through the reaction tube almost perpendicularly to the selectively permeable membrane as indicated by the arrows in FIG. 14.

The embodiments of the selectively permeable membrane reactor according to the present invention have been described above. Even if a plurality of selectively permeable membranes are provided or the shape of the reactor is not cylindrical, for example, the arrangement and the structure of the foamed bodies and the straightening vanes may suitably be employed by appropriately modifying the above embodiments.

EXAMPLES

The present invention is described below in more detail by way of examples. Note that the present invention is not limited to the following examples.

Example 1

A selectively permeable membrane reactor was produced which has the same shape as the selectively permeable membrane reactor 100 shown in FIG. 1. An alumina porous body (outer diameter: 10 mm, length: 75 mm) in the shape of a bottomed cylinder of which one end was closed was used as the separation tube. A palladium (Pd)-silver (Ag) alloy film selectively allowing hydrogen to pass through was formed by plating on the surface of the alumina porous body as the selectively permeable membrane. The composition of the film was adjusted so that Pd was 75 mass % and Ag was 25 mass % taking hydrogen permeability into consideration. The thickness of the film was 2.5 µm. As the catalyst, a slurry including a powdered ruthenium catalyst was carried by dipping over the entire surface of a disk-shaped foamed body (corresponding to the foamed body 7b in FIG. 1) and a cylindrical foamed body (corresponding to the foamed body 7a in FIG. 1). The disk-shaped foamed body was formed of cordierite and had a diameter of 14 mm, a length of 20 mm, a porosity of 70%, and a pore size of 500 µm. The cylindrical foamed body was formed of cordierite and had a diameter of 14 mm, an inner diameter of 11 mm, a length of 70 mm, a porosity of 70%, and a pore size of 500 µm. The distance between the foamed body and the selectively permeable membrane was about 0.5 mm. The reaction tube was formed of SUS316 so that the reaction tube could withstand a high temperature of about 300 to 600° C. The inner diameter of the reaction tube was 14 mm.

Example 2

A selectively permeable membrane reactor was produced which was similar to the selectively permeable membrane reactor 200 shown in FIG. 2. An alumina porous body (outer diameter: 10 mm, length: 75 mm) in the shape of a bottomed cylinder of which one end was closed was used as the separation tube. A palladium (Pd)-silver (Ag) alloy film selectively allowing hydrogen to pass through was formed by plating on the surface of the alumina porous body as the selectively permeable membrane. The composition of the film was adjusted so that Pd was 75 mass % and Ag was 25 mass % taking hydrogen permeability into consideration. The thickness of the film was 2.5 µm. As the catalyst, a slurry including a powdered ruthenium catalyst was carried by dipping over the entire surface of a disk-shaped foamed body (corresponding to the foamed body 7b in FIG. 2) and a cylindrical foamed body divided into three sections (corresponding to the foamed body 7c in FIG. 2). The disk-shaped foamed body was formed of cordierite and had a diameter of 14 mm, a length of 20 mm, a porosity of 70%, and a pore size of 500 µm. Each of the cylindrical foamed bodies divided into three sections was formed of cordierite and had a diameter of 14 mm, an inner diameter of 11 mm, a length of 22 mm, a porosity of 70%, and a pore size of 500 µm. Three straightening vanes (corresponding to the straightening vanes 8a, 8b, and 8c in FIG. 2) were formed of SUS316. Each straightening vane had an outer diameter of 14 mm and an inner diameter of 11 mm. The three straightening vanes were disposed between the cylindrical foamed bodies divided into three sections and on the discharge port side (downstream). Four circular holes with a diameter of 2 mm were formed in the straightening vanes excluding the straightening vane provided furthest downstream so that the circular holes were displaced by 45 degrees (see FIGS. 3, 4, and 5). The distance between the foamed body and the selectively permeable membrane and the distance between the straightening vane and the selectively permeable membrane were respectively about 0.5 mm. The reaction tube was formed of SUS316 so that the reaction tube could withstand a high temperature of about 300 to 600° C. The inner diameter of the reaction tube was 14 mm.

Example 3

A selectively permeable membrane reactor similar to the selectively permeable membrane reactor 200 shown in FIG. 2 was produced in the same manner as in Example 2 except that the disk-shaped and cylindrical foamed bodies had a porosity of 90%.

Example 4

A selectively permeable membrane reactor was produced which was similar to the selectively permeable membrane reactor 900 shown in FIG. 9. An alumina porous body (outer diameter: 10 mm, length: 75 mm) in the shape of a bottomed cylinder of which one end was closed was used as the separation tube. A palladium (Pd)-silver (Ag) alloy film selectively allowing hydrogen to pass through was formed by plating on the surface of the alumina porous body as the selectively permeable membrane. The composition of the film was adjusted so that Pd was 75 mass % and Ag was 25 mass % taking hydrogen permeability into consideration. The thickness of the film was 2.5 μm. As the catalyst, a slurry including a powdered ruthenium catalyst was carried by dipping over the entire surface of a disk-shaped foamed body (corresponding to the foamed body 7b in FIG. 9) and a cylindrical foamed body before being divided (corresponding to the foamed body 7c in FIG. 9). The disk-shaped foamed body was formed of cordierite and had a diameter of 14 mm, a length of 20 mm, a porosity of 90%, and a pore size of 500 μm. The cylindrical foamed body was formed of cordierite and had a diameter of 14 mm, an inner diameter of 11 mm, a length of 70 mm, a porosity of 90%, and a pore size of 500 μm before being divided. The cylindrical foamed body was equally divided into two sections along the plane including the center axis in the shape of a semicylinder. One of the equally divided foamed bodies was cut to a length of 13 mm, 26 mm, and 26 mm from the supply port side (upstream) almost perpendicularly to the flow of the raw material gas, and the other of the equally divided foamed bodies was cut to a length of 26 mm, 26 mm, and 13 mm from the supply port side (upstream) almost perpendicularly to the flow of the raw material gas to obtain six semicylindrical foamed bodies. Six half ring-shaped straightening vanes (corresponding to the straightening vanes 18a, 18b, 18c, 18d, 18e, and 18f in FIGS. 9 and 10) were formed of SUS316. Each straightening vane was formed by equally dividing a ring having an outer diameter of 14 mm and an inner diameter of 11 mm into two sections. The six straightening vanes were disposed between the divided semicylindrical foamed bodies, between the disk-shaped foamed body and the divided semicylindrical foamed body, or the discharge port side (downstream) of the divided semicylindrical foamed body (see FIG. 9) in the same manner as in the selectively permeable membrane reactor 900 shown in FIG. 9. The distance between the foamed body and the selectively permeable membrane and the distance between the straightening vane and the selectively permeable membrane were respectively about 0.5 mm. The reaction tube was formed of 316SS so that the reaction tube could withstand a high temperature of about 300 to 600° C. The inner diameter of the reaction tube was 14 mm.

Example 5

A selectively permeable membrane reactor was produced which was similar to the selectively permeable membrane reactor 910 shown in FIG. 11. An alumina porous body (outer diameter: 10 mm, length: 75 mm) in the shape of a bottomed cylinder of which one end was closed was used as the separation tube. A palladium (Pd)-silver (Ag) alloy film selectively allowing hydrogen to pass through was formed by plating on the surface of the alumina porous body as the selectively permeable membrane. The composition of the film was adjusted so that Pd was 75 mass % and Ag was 25 mass % taking hydrogen permeability into consideration. The thickness of the film was 2.5 μm. As the catalyst, a slurry including a powdered ruthenium catalyst was carried by dipping over the entire surface of a disk-shaped foamed body (corresponding to the foamed body 7b in FIG. 11) and a cylindrical foamed body before being divided (corresponding to the foamed body 7c in FIG. 11). The disk-shaped foamed body was formed of cordierite and had a diameter of 14 mm, a length of 20 mm, a porosity of 90%, and a pore size of 500 μm. The cylindrical foamed body was formed of cordierite and had a diameter of 14 mm, an inner diameter of 11 mm, a length of 70 mm, a porosity of 90%, and a pore size of 500 μm before being cut. The cylindrical foamed body was cut to a length of 13 mm almost perpendicularly to the flow of the raw material gas from the supply port side (upstream) to obtain five cylindrical foamed bodies. Four straightening vanes were formed of SUS316. The straightening vanes were ¾ ring-shaped straightening vanes formed by removing ¼th of a ring with an outer diameter of 14 mm and an inner diameter of 11 mm (corresponding to the straightening vanes 28a, 28b, 28c, and 28d in FIGS. 11 and 12; θ was 90 degrees instead of 60 degrees). The four straightening vanes were disposed between the divided cylindrical foamed bodies in the same manner as in the selectively permeable membrane reactor 910 shown in FIG. 11 (see FIG. 11). The distance between the foamed body and the selectively permeable membrane and the distance between the straightening vane and the selectively permeable membrane were respectively about 0.5 mm. The reaction tube was formed of SUS316 so that the reaction tube could withstand a high temperature of about 300 to 600° C. The inner diameter of the reaction tube was 14 mm.

Comparative Example 1

Figure 8:
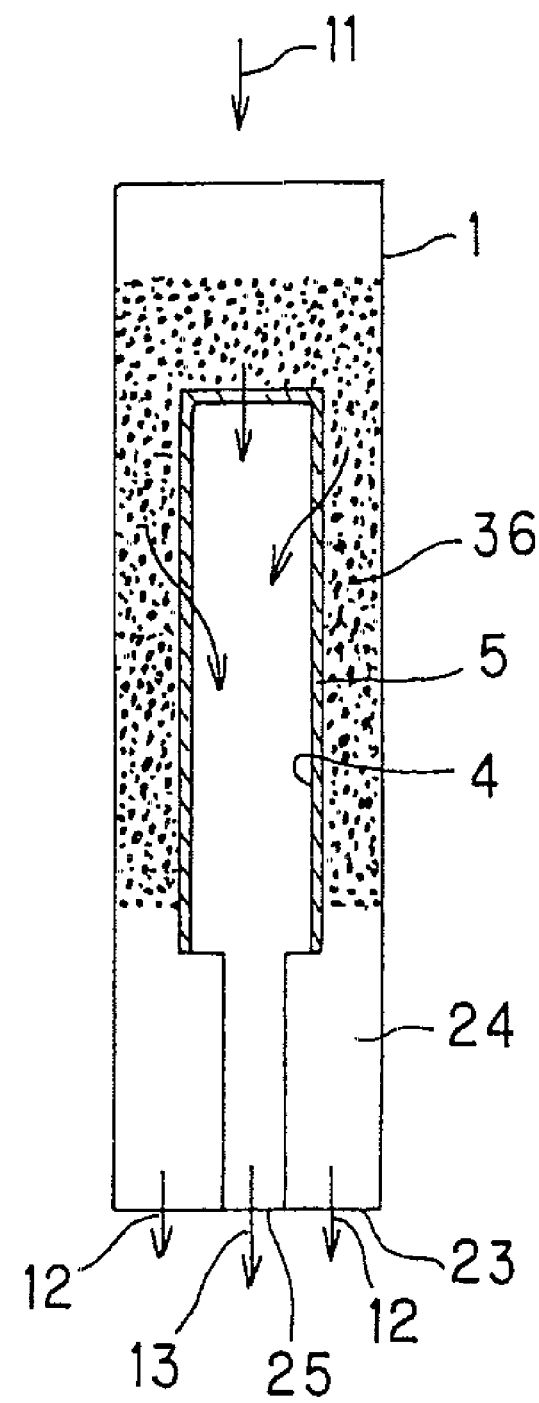
FIG. 8 is a cross-sectional view showing a conventional selectively permeable membrane reactor produced in the example.

A selectively permeable membrane reactor was produced having a conventional structure as shown in FIG. 8. In this selectively permeable membrane reactor, the pellet-shaped catalyst 36 was provided between the reaction tube 1 and the separation tube 4 as a packed bed in the same manner as in the selectively permeable membrane reactor shown in FIG. 7. The size of the catalyst 36 was about 1 mm. The material for the catalyst 36 was a ruthenium-based material in the same manner as in Example 1. The remaining constitutions are the same as Example 1 including the size and the shape of the reaction tube 1 and the separation tube 4 and the like.

Figure 6:
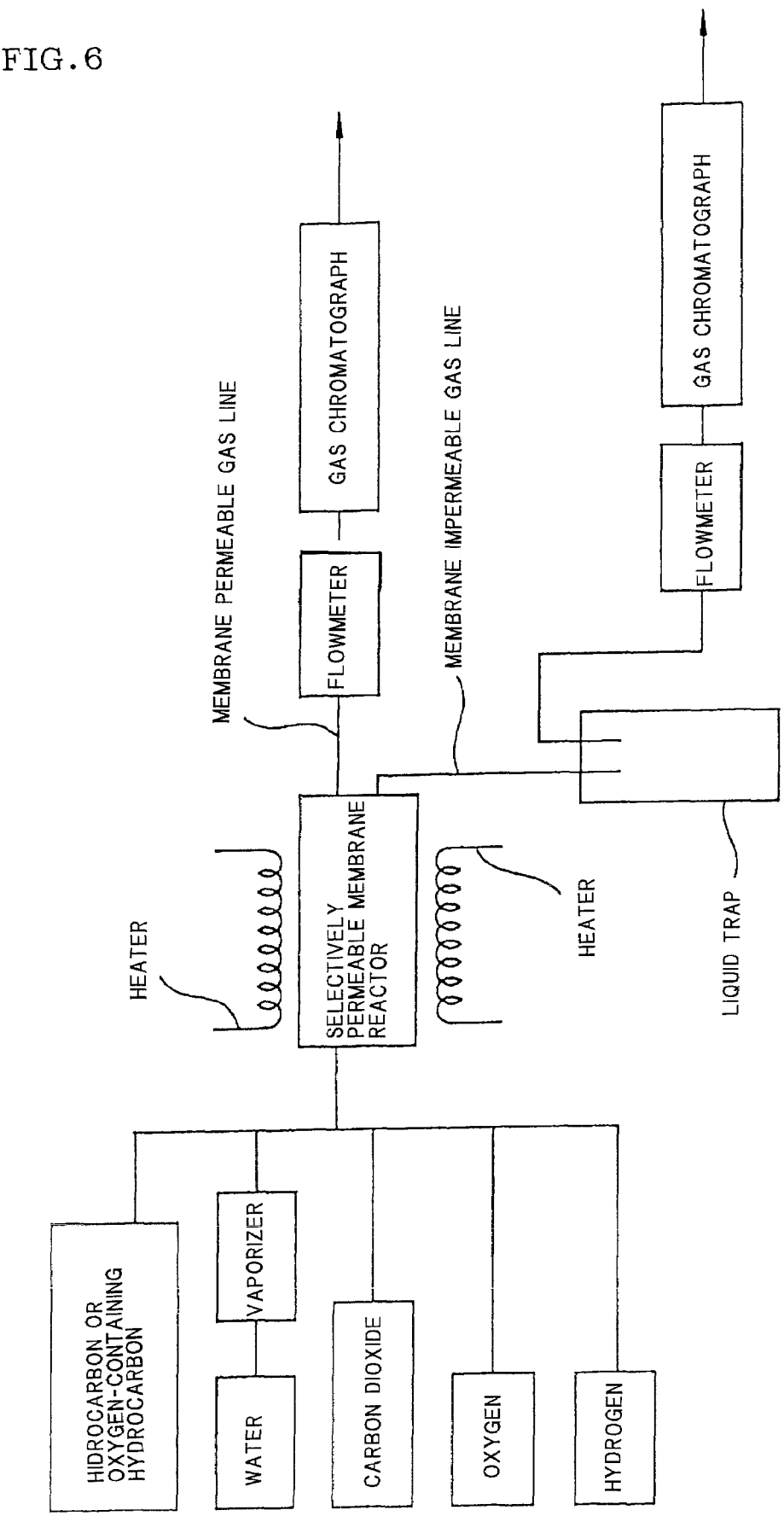
FIG. 6 is a view schematically showing a testing device used in the examples.

(Evaluation) The selectively permeable membrane reactors of Examples 1 to 5 and Comparative Example 1 were tested and evaluated using a device shown in FIG. 6.

In the first place, the device is described below. The device is connected so that a hydrocarbon such as methane or butane, an oxygen-containing hydrocarbon such as methanol, water, carbon dioxide, and oxygen can be used as the raw material gas. These gases can be optionally selected, mixed, and supplied to the selectively permeable membrane reactor. The liquid raw materials such as water and methanol are vaporized using a vaporizer and then supplied. The upstream side of a membrane permeable gas line and a membrane impermeable gas line are connected with a membrane permeable side (separation tube process port) and a membrane impermeable side (reaction tube discharge port) of the selectively permeable membrane reactor. A flowmeter for measuring the gas flow and a gas chromatograph for quantitatively determining the gas components are connected with the downstream side of the membrane permeable gas line. A flowmeter and a gas chromatograph are similarly connected with the downstream side of the membrane impermeable gas line. A liquid trap set at about 5° C. is provided on the upstream side of the flowmeter for collecting liquid components such as water at room temperature. A heater is provided around the selectively permeable membrane reactor so that the selectively permeable membrane reactor can externally be heated.

The test method is as follows. Methane and steam were supplied to the selectively permeable membrane reactor as the raw material gas at a molar ratio of $H_2O/CH_4=3$. A reforming reaction between methane and steam and a reaction accompanying the reforming reaction were allowed to occur, and hydrogen was selectively separated from the reaction product. The reaction temperature was adjusted to 550° C., the reaction-side pressure was 3 atm, and the permeation-side pressure was 0.1 atm. The flow rate of the raw material gas was adjusted so that the flow rate of methane was 250 cc/min. The hydrogen recovery rate (=hydrogen passed through selectively permeable membrane/hydrogen produced by reaction), the methane conversion rate, and the hydrogen concentration were calculated by determining the gas flow rate and the gas composition of the membrane permeable side and the membrane impermeable side. The results are shown in Table 1.

TABLE 1

|  | Example 1 | Example 2 | Example 3 | Example 4 | Example 5 | Comparative Example 1 |
|---|---|---|---|---|---|---|
| Hydrogen recovery rate (%) | 83 | 85 | 87 | 95 | 96 | 80 |
| Methane conversion rate (%) | 80 | 83 | 86 | 93 | 95 | 75 |
| Membrane permeable side hydrogen concentration (%) | 99.93 | 99.96 | 99.95 | 99.95 | 99.96 | 99.10 |

(Consideration) From the results shown in Table 1, the hydrogen recovery rate and the methane conversion rate obtained in Examples 1 to 5 were relatively higher than those of Comparative Example 1. When comparing Example 1 with Examples 2 to 5, a high hydrogen recovery rate was obtained in Examples 2 to 5 in which the straightening vanes were inserted to cause the gas to flow toward the membrane in comparison with Example 1 in which the straightening vanes were not provided. When comparing Example 2 with Examples 3 to 5, the hydrogen recovery rate was improved in Examples 3 to 5 using a foamed body with a high porosity in comparison with Example 2 due to high gas diffusion properties. When comparing Example 3 with Examples 4 and 5 differing in the configuration of the straightening vanes (stirring means), the hydrogen recovery rate in Examples 4 and 5 was higher than that of Example 3. This was considered to be because, according to the configuration of the straightening vanes (see FIGS. 9 and 11) of Examples 4 and 5, the gas (raw material gas or mixed gas produced from the raw material gas) is caused to flow in the direction perpendicular to the membrane. When comparing Examples 4 and 5, the hydrogen recovery rate of Example 5 was higher than that of Example 4. This was considered to be because, since the straightening vanes of Example 5 (see FIG. 12) had a large substantial portion and a small opening in comparison with the straightening vanes (see FIG. 10) of Example 4, the gas (raw material gas or mixed gas produced from the raw material gas) flowed more perpendicularly to the membrane. From the above results, it was confirmed that it is effective to increase the contact efficiency of the mixed gas with the selectively permeable membrane by disposing the catalyst as a foam-molded product in order to increase the performance of the selectively permeable membrane reactor.

While the purity of hydrogen obtained from the selectively permeable membrane in Comparative Example 1 was about 99.1%, the purity of hydrogen obtained from the selectively permeable membrane in each of Examples 1 to 5 was about 99.9% or more. The selectively permeable membrane reactor was disassembled and observed after the test. In Comparative Example 1, scratches considered to occur due to contact with the catalyst were observed on the surface of the selectively permeable membrane. From the above results, it was confirmed that the hydrogen recovery rate is improved due to efficient taking-out of hydrogen and that the methane conversion rate is improved by using the selectively permeable membrane reactor according to the present invention. This means that, when obtaining a hydrogen recovery rate and a methane conversion rate equal to those of a conventional selectively permeable membrane reactor using the selectively permeable membrane reactor according to the present invention, the selectively permeable membrane reactor can be reduced in size and deterioration in the metal member and power consumption can be reduced by reducing the operating temperature.

INDUSTRIAL APPLICABILITY

The selectively permeable membrane reactor according to the present invention may be utilized to produce, separate, and take out a specific gas component such as hydrogen using a main raw material gas such as a hydrocarbon (e.g. methane, butane, and kerosene) and an oxygen-containing hydrocarbon (e.g. methanol, ethanol, or dimethyl ether) and other raw material gases such as water, carbon dioxide, and oxygen by utilizing a reforming reaction, a partial oxidation reaction, a decomposition reaction, and the like involving steam or carbon dioxide. The selectively permeable membrane reactor according to the present invention may also be used to produce, separate, and take out a specific gas component such as hydrogen utilizing a dehydrogenation reaction of a hydrocarbon such as cyclohexane.

The invention claimed is:
1. A selectively permeable membrane reactor comprising:
a reaction tube including an internal space having a supply port as an inlet port for a raw material gas and a discharge port as an outlet port for an unseparated gas, and a separation tube inserted into the internal space of the reaction tube,
the separation tube including a selectively permeable membrane exhibiting selective permeability for a specific component on a surface facing the internal space of the reaction tube, and a process port as an outlet port for a separated gas which has passed through the selectively permeable membrane,
the selectively permeable membrane reactor comprising a foamed body having a porous structure and exhibiting a catalytic effect for promoting a chemical reaction in the internal space of the reaction tube excluding the separation tube, wherein the foamed body exhibiting a catalytic effect is not in contact with the selectively permeable membrane and a gap between the foamed body exhibiting a catalytic effect and the selectively permeable membrane is between 500 μm and 2 mm.
2. The selectively permeable membrane reactor according to claim 1, wherein a catalyst is disposed in the internal space of the reaction tube excluding the separation tube by being carried by the foamed body as a carrier or by forming the foamed body.

3. The selectively permeable membrane reactor according to claim 1, wherein the foamed body exhibiting a catalytic effect has a pore size of 50 μm to 3 mm.

4. The selectively permeable membrane reactor according to claim 3, wherein the foamed body exhibiting a catalytic effect has a porosity of 50 to 98%.

5. The selectively permeable membrane reactor according to claim 1, wherein the foamed body exhibiting a catalytic effect is formed of a ceramic material selected from alumina ($Al_2O_3$), zirconia ($ZrO_2$), titania ($TiO_2$), mullite ($3Al_2O_3.2SiO_2$), cordierite ($2MgO.2Al_2O_3.5SiO_2$), silicon carbide (SiC), silicon-infiltrated silicon carbide (Si—SiC), and silicon nitride ($Si_3 N_4$), a pure metal material selected from nickel (Ni), iron (Fe), cobalt (Co), copper (Cu), and silver (Ag), or an alloy material selected from nickel (Ni)-iron (Fe), nickel (Ni)-cobalt (Co), nickel (Ni)-copper (Cu), and stainless steel.

6. The selectively permeable membrane reactor according to claim 1, wherein the distance between the foamed body exhibiting a catalytic effect and the selectively permeable membrane is 100 μm to 20 mm.

7. The selectively permeable membrane reactor according to claim 6, wherein the foamed body exhibiting a catalytic effect has a length in a direction almost perpendicular to a direction from the supply port to the discharge port of 1 to 100 mm between an inner wall surface of the reaction tube and the selectively permeable membrane.

8. The selectively permeable membrane reactor according to claim 7, wherein the foamed body is divided into a plurality of sections, and a stirring means for stirring the raw material gas supplied to the internal space of the reaction tube through the supply port to disturb the flow of the raw material gas is provided between the sections of the foamed body.

9. The selectively permeable membrane reactor according to claim 8, comprising a plurality of the stirring means.

10. The selectively permeable membrane reactor according to claim 9, wherein the stirring means are straightening vanes disposed almost perpendicularly to the flow of the raw material gas.

11. The selectively permeable membrane reactor according to claim 10, wherein an opening through which the raw material gas passes is not formed in the straightening vane constituting the stirring means disposed on the side nearest to the discharge port, and an opening through which the raw material gas passes is formed in the remaining straightening vanes.

12. The selectively permeable membrane reactor according to claim 11, wherein the openings formed in the straightening vanes excluding the straightening vane disposed on the side nearest to the discharge port are circular holes.

13. The selectively permeable membrane reactor according to claim 10, wherein openings through which the raw material gas passes are formed in all of the straightening vanes constituting the stirring means so that the openings formed in at least the adjacent straightening vanes do not overlap in the flow direction of the raw material gas.

14. The selectively permeable membrane reactor according to claim 13, wherein the straightening vanes are not in contact with the selectively permeable membrane.

15. The selectively permeable membrane reactor according to claim 14, wherein the distance between the straightening vanes and the selectively permeable membrane is 100 μm to 20 mm.

16. The selectively permeable membrane reactor according to claim 1, wherein the chemical reaction is a reforming reaction, a partial oxidation reaction, or a decomposition reaction involving steam and/or carbon dioxide using a hydrocarbon and/or an oxygen-containing hydrocarbon as a first raw material gas and one or two or more of water, carbon dioxide, and oxygen as a second raw material gas, the selectively permeable membrane reactor can produce a specific gas component utilizing the chemical reaction, and the separated gas is hydrogen.

17. The selectively permeable membrane reactor according to claim 1, wherein the selectively permeable membrane reactor can produce a specific gas component utilizing a dehydrogenation reaction of a hydrocarbon such as cyclohexane, and the separated gas is hydrogen.

18. The selectively permeable membrane reactor according to claim 2, wherein the foamed body exhibiting a catalytic effect has a pore size of 50 μm to 3 mm.

19. The selectively permeable membrane reactor according to claim 18, wherein the foamed body exhibiting a catalytic effect has a porosity of 50 to 98%.

* * * * *